US007628132B2

(12) United States Patent
Charlon

(10) Patent No.: US 7,628,132 B2
(45) Date of Patent: Dec. 8, 2009

(54) AIR INTAKE DUCT ARRANGEMENT FOR AN INTERNAL COMBUSTION ENGINE

(75) Inventor: Stephane Charlon, Rueil Malmaison (FR)

(73) Assignee: Renault s.a.s., Boulogne-billancourt (FR)

(*) Notice: Subject to any disclaimer, the term of this patent is extended or adjusted under 35 U.S.C. 154(b) by 36 days.

(21) Appl. No.: 11/722,259

(22) PCT Filed: Dec. 1, 2005

(86) PCT No.: PCT/FR2005/051025

§ 371 (c)(1),
(2), (4) Date: Feb. 12, 2008

(87) PCT Pub. No.: WO2006/067342

PCT Pub. Date: Jun. 29, 2006

(65) Prior Publication Data

US 2008/0283013 A1 Nov. 20, 2008

(30) Foreign Application Priority Data

Dec. 20, 2004 (FR) .................................. 04 53098

(51) Int. Cl.
*F02M 35/10* (2006.01)
*F16M 1/00* (2006.01)

(52) U.S. Cl. ............................. 123/184.21; 123/90.38; 123/195 C

(58) Field of Classification Search ........... 123/184.21, 123/90.38, 195 C
See application file for complete search history.

(56) References Cited

U.S. PATENT DOCUMENTS

| | | | |
|---|---|---|---|
| 4,640,256 | A | 2/1987 | Conrad et al. |
| 2003/0217740 | A1 | 11/2003 | Zimmermann et al. |

FOREIGN PATENT DOCUMENTS

| | | |
|---|---|---|
| EP | 1 096 138 | 5/2001 |
| FR | 734 631 | 10/1932 |
| JP | 06081739 A * | 3/1994 |

* cited by examiner

*Primary Examiner*—Noah Kamen
(74) *Attorney, Agent, or Firm*—Oblon, Spivak, McClelland, Maier & Neustadt, P.C.

(57) ABSTRACT

An air intake duct arrangement for an internal combustion engine in which a cylinder head is fixed on a body shell of a motor vehicle via a damping element. The cylinder head is closed by a set of timing gear cases, and the intake duct includes an intermediate portion connected to an upstream portion connected to a heat exchanger and to a downstream portion supplying air towards an intake manifold. The upstream and downstream portions include a fixing mechanism configured to co-operate with the intermediate portion. The intermediate portion is integrated in the timing gear case of the engine.

9 Claims, 3 Drawing Sheets

AIR INTAKE DUCT ARRANGEMENT FOR AN INTERNAL COMBUSTION ENGINE

BACKGROUND OF THE INVENTION

1. Field of the Invention

The present invention relates to an air intake duct arrangement for an internal combustion engine whose cylinder head is fastened to the body of a motor vehicle by way of a damping element, the cylinder head being closed by a set of timing gear cases, and the intake duct consisting of an intermediate portion joined, on the one hand, to an upstream portion connected to a heat exchanger, and, on the other hand, to a downstream portion channeling air toward an intake manifold, the upstream and downstream portions being fastened to the intermediate portion.

2. Discussion of the Background

In the conventional architecture of a motor vehicle engine block, the ducts supplying the engine with gas or collecting the exhaust gases are not installed in such a way as to optimize gas flow. This is because these ducts are positioned within the tight confines of the engine block, between the wiring, the water ducts, the air conditioning ducts and the fuel ducts. Most of the time, this type of duct winds its way around the engine block and the structure, restricting the shape of the duct to the detriment of its function.

One of the disadvantages of the air intake ducts of an engine is that they take up space in the engine compartment and do not make it easy to incorporate other components. Furthermore, the cross section of the intake duct is not constant because of its shape, and this can lead to pressure drops and cause a reduction in the performance of the internal combustion engine.

Document FR-2548731 proposes to site a timing gear case in the form of a housing fitted with a filter directly on top of the cylinder heads This integration makes it possible to obtain an effective mixing of the exhaust gases with the combustion air, the exhaust duct maintains a complex shape which clutters up the engine compartment and does not optimize the use of space.

SUMMARY OF THE INVENTION

The present invention aims to alleviate the disadvantages associated with this type of architecture by proposing a new way of installing the air intake duct which makes it possible to reduce pressure drops while at the same time ensuring that the timing gear system is gastight.

To this end, the present invention proposes for the intermediate portion of the intake duct to be integrated with the timing gear case of the engine.

The proposed arrangement may have the following features, taken individually or in combination:

- the intermediate portion is cast in one piece with the casing,
- the intermediate portion has at least one fastening hole intended for receiving the engine cap,
- the intake duct of the intermediate portion has a constant cross section,
- the intermediate portion has at least two upstream and downstream stubs intended for respectively receiving the means for fastening the upstream and downstream portions,
- the means for fastening the upstream and downstream portions can be snap-fitted to the intermediate portion,
- the means for fastening the upstream and downstream portions can be clamped onto the intermediate portion,
- the means for fastening the upstream and downstream portions comprise a clamping collar intended to secure them to the intermediate portion, and
- the internal combustion engine is a V-engine.

BRIEF DESCRIPTION OF THE DRAWINGS

The invention will be better understood from reading the following description of one particular and nonlimiting embodiment thereof in conjunction with the attached drawings in which.

DETAILED DESCRIPTION OF THE PREFERRED EMBODIMENTS

Figure 1:
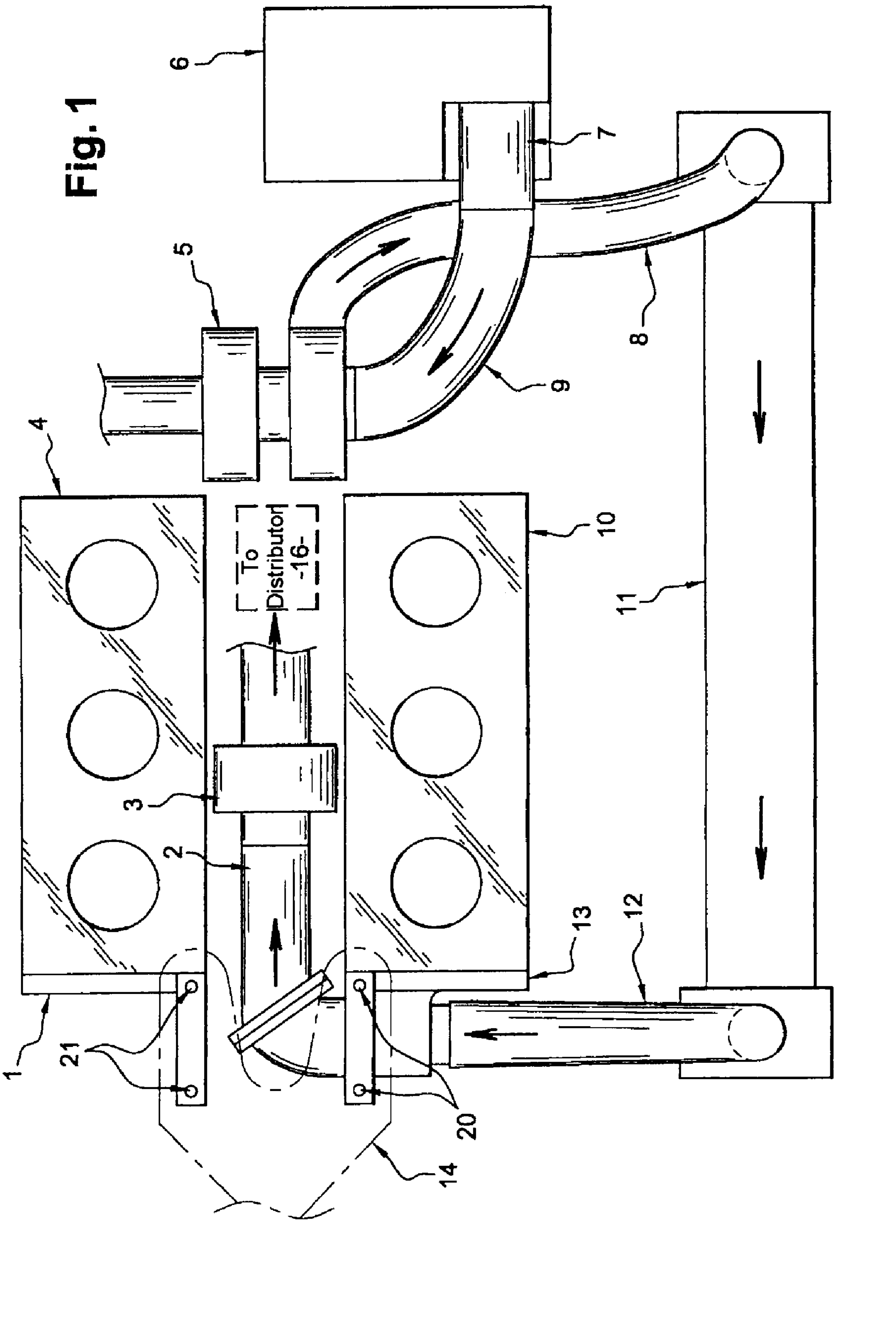
FIG. 1 is a diagram of the overall layout of the air intake duct integrated into the timing gear case of the V-engine.

FIG. 1 is an overall layout diagram of an internal combustion engine and shows the course followed by the air supplied to the V-engine. The air passes first of all through an air filter 6 to which a flow meter 7 is attached. The air is then sent toward a turbocompressor 5 via an upstream pipe 9. Once compressed, the air is carried by a compressor outlet pipe 8 to a charge air cooler 11. The charge air cooler 11 is, for example, a conventional heat exchanger consisting of a tube bundle able to exchange energy between the compressed air and the external air flowing between the tubes.

On leaving the charge air cooler 11, an intake duct directs the air stream toward a cut-off unit then to the air intake distributors 16 that distribute the air to the front and rear banks of the internal combustion engine. This air intake distributor is made up of an upstream portion 12, of an intermediate portion 19 and of a downstream portion 2. The upstream portion 12 is positioned between the outlet of the charge air cooler 11 and the intermediate portion 19 which connects the upstream portion 12 to the downstream portion 2. The latter allows the stream of compressed air to be directed toward an air cut-off unit 3, itself connected to the intake distributor 16. The downstream portion 2 and the air cut-off unit 3 lie between the respective cylinder heads of the front 10 and rear 4 banks, as depicted in the perspective view of FIG. 2.

Figure 3:
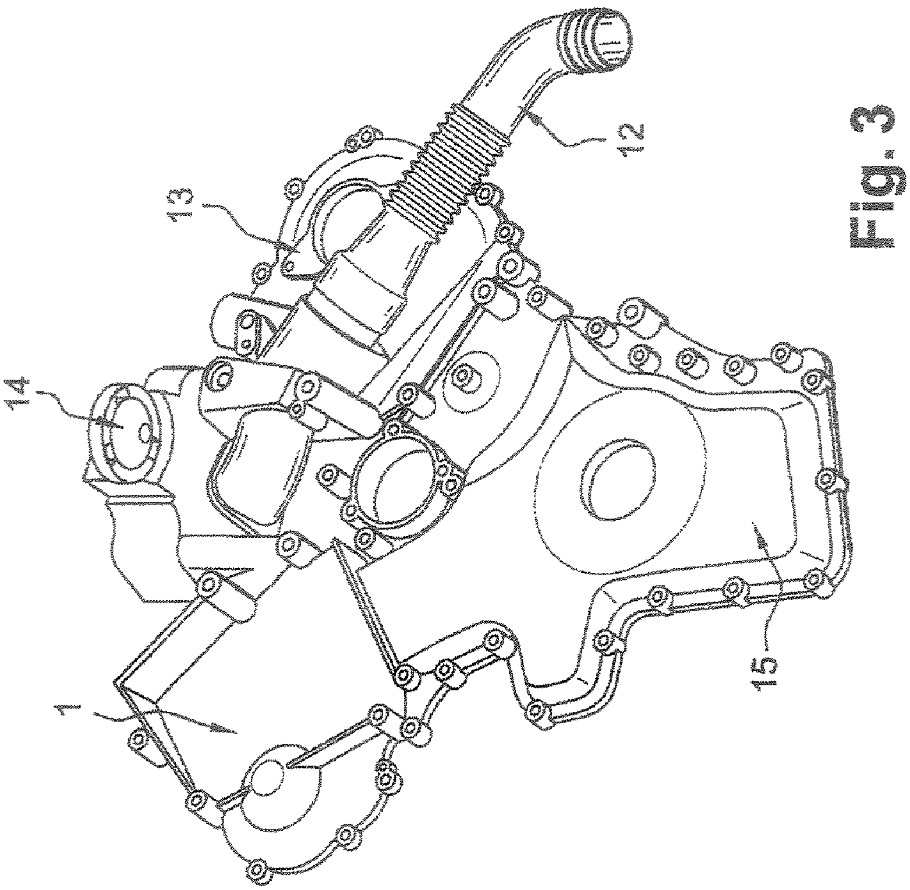
FIG. 3 is a view in perspective from below of the engine timing gear case.
Figure 2:
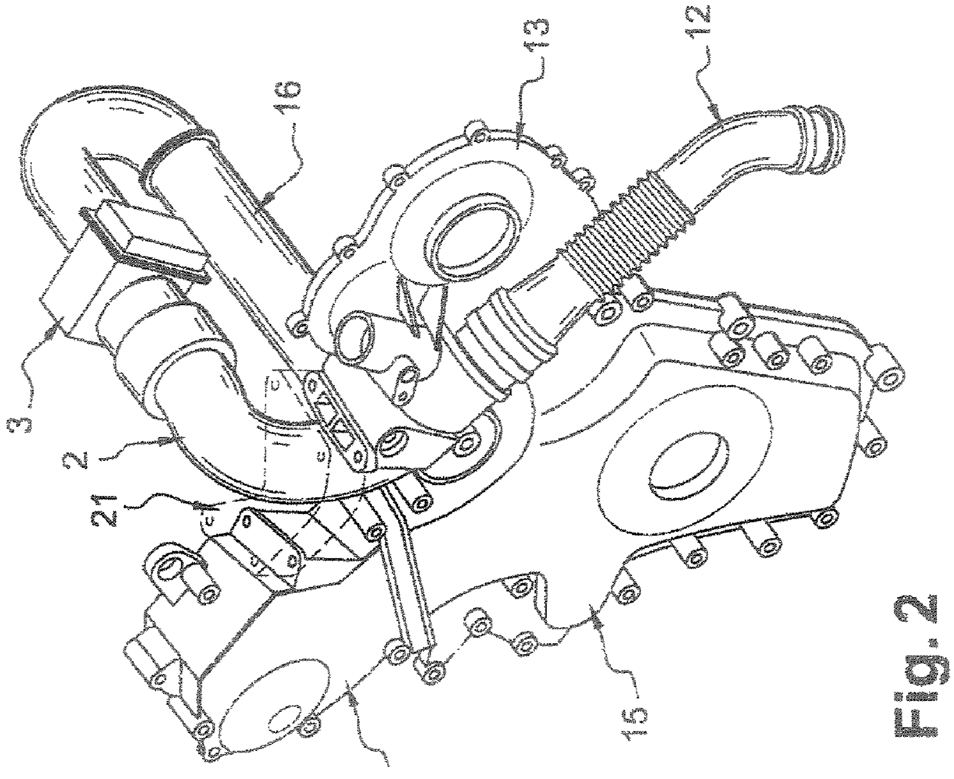
FIG. 2 is a view in perspective from above of the engine timing gear case.
Figure 4:
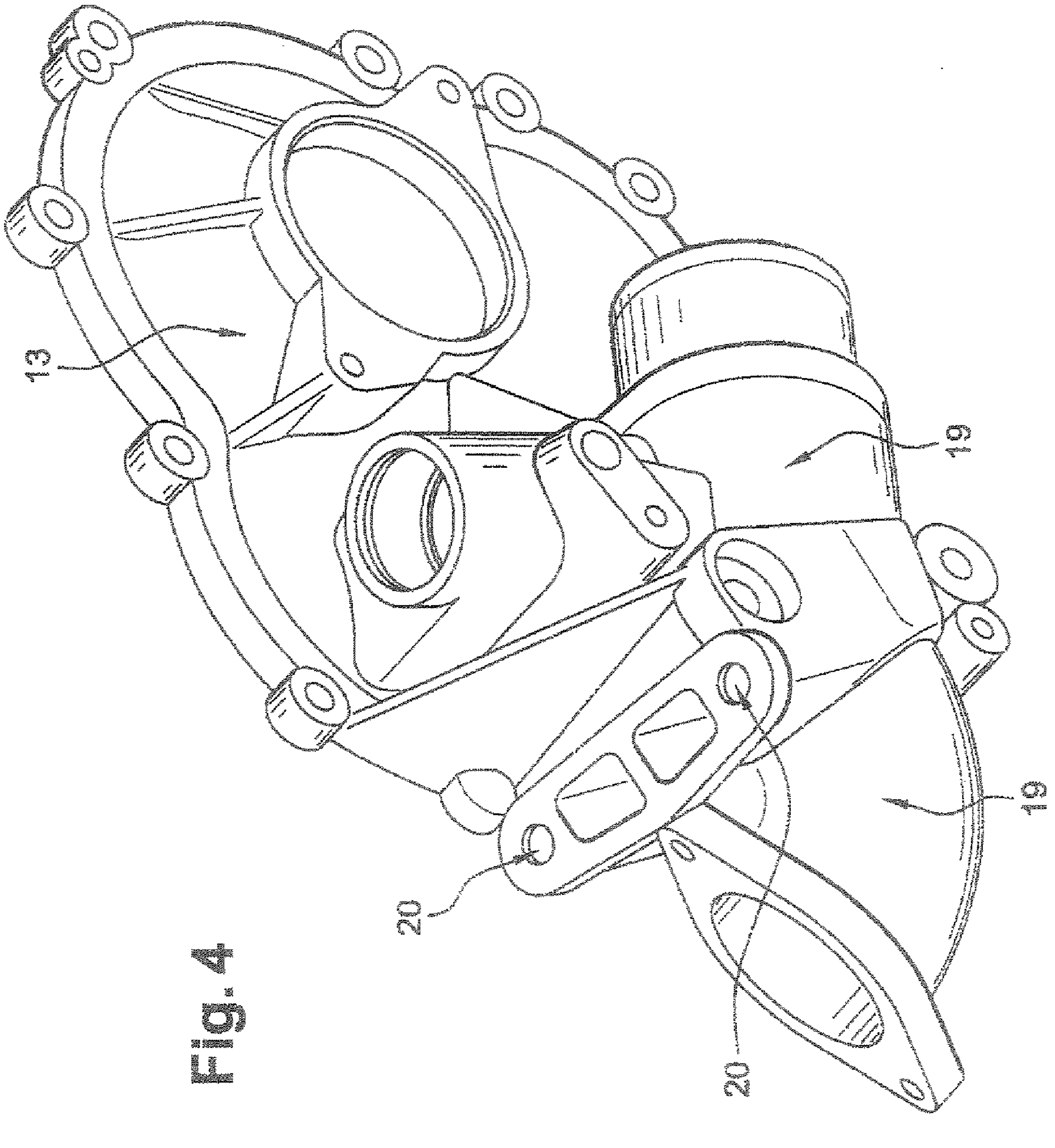
FIG. 4 is a perspective view of part of the engine timing gear case showing the intermediate portion of the intake duct.

FIGS. 2 and 3 depict the layout of the V-engine timing gear cases. A first timing gear case 1 is secured to the cylinder head of the rear bank 4. A second case 15 is positioned on the cylinder block of the engine and has faces in contact with the other two cases 1 and 13. The third case 13, as depicted in perspective in FIG. 4, comprises the intermediate portion 19 and is joined to the cylinder block of the front bank 10. The intermediate portion 19 of the intake duct is integrated into the casting of the case 13, which is screwed to the cylinder block.

The intermediate portion 19 integrated into the case 13 comprises stubs at its ends, these stubs being intended to receive the means for fastening to the upstream and downstream portions. Conventionally, these fastening means may involve snap-fitting, or clamping using a collar, a clamp or alternatively a V-band. The fact that the intermediate portion 19 is directly cast as part of the case 13 makes it possible to obtain an air intake duct which runs round the engine block less tortuously that in the prior art. In addition, the cross section of the intake duct is constant along its length, making it possible to reduce the pressure drops and the engine consumption. The present invention is more compact than an air pipe separate from the case, which supports an additional function.

In another embodiment of the invention, the case 13 may also comprise fixing supports intended to receive the means of attachment of an engine cap 14. This engine cap 14 is fixed on each side of the cylinder block on fixing supports positioned on the cases 1 and 13 respectively. The case 13 thus allows the incorporation of several functions into a single component. This integration is aimed at improving the architecture of the engine block, at improving performance in terms of consumption and at reducing the number of components.

The invention claimed is:

1. An air intake duct arrangement for an internal combustion engine whose cylinder head is fastened to a body of a motor vehicle by a damping element, the cylinder head being closed by a set of timing gear cases, and the intake duct including an intermediate portion joined to an upstream portion connected to a heat exchanger, and to a downstream portion channeling air toward an intake manifold, the upstream and downstream portions being fastened to the intermediate portion, wherein the intermediate portion is integrated with the timing gear case of the engine.

2. The air intake duct arrangement for an internal combustion engine as claimed in claim 1, wherein the intermediate portion is cast in one piece with the casing.

3. The air intake duct arrangement for an internal combustion engine as claimed in claim 1, wherein the intermediate portion includes at least one fastening hole configured to receive the engine cap.

4. The air intake duct arrangement for an internal combustion engine as claimed in claim 1, wherein the intake duct of the intermediate portion has a constant cross section.

5. The air intake duct arrangement for an internal combustion engine as claimed in claim 1, wherein the intermediate portion includes at least two upstream and downstream stubs configured to respectively receive means for fastening the upstream and downstream portions.

6. The air intake duct arrangement for an internal combustion engine as claimed in claim 1, wherein means for fastening the upstream and downstream portions can be snap-fitted to the intermediate portion.

7. The air intake duct arrangement for an internal combustion engine as claimed in claim 1, wherein means for fastening the upstream and downstream portions can be clamped onto the intermediate portion.

8. The air intake duct arrangement for an internal combustion engine as claimed in claim 1, wherein means for fastening the upstream and downstream portions comprises a clamping collar configured to secure the upstream and downstream portions to the intermediate portion.

9. The air intake duct arrangement for an internal combustion engine as claimed in claim 1, wherein the internal combustion engine is a V-engine.

* * * * *